Dec. 2, 1969     J. J. FLING     3,481,577
STYLUS STEERING SYSTEM FOR A TRACER VALVE
Filed Nov. 3, 1966     2 Sheets-Sheet 2

TRAVERSE DIRECTION

INVENTOR.
JOHN J. FLING
BY
ATTORNEYS.

United States Patent Office 3,481,577
Patented Dec. 2, 1969

3,481,577
STYLUS STEERING SYSTEM FOR A TRACER VALVE
John J. Fling, Los Angeles, Calif., assignor to True-Trace Corporation, El Monte, Calif., a corporation of Connecticut
Filed Nov. 3, 1966, Ser. No. 591,809
Int. Cl. B23q *35/28;* H02p *7/38;* B23c *7/00*
U.S. Cl. 251—3                                14 Claims

ABSTRACT OF THE DISCLOSURE

A steering system according to the present disclosure comprises a stylus for tracing along the profile of a pattern and being deflectible to various positions around stylus axis to seek contact with the profile. Valve means is controlled by the stylus and bias means is connected to a tracer valve for rotational movement around the stylus axis for exerting a lateral force on the stylus. Sensing means is provided for sensing the stylus position and rotatable means is provided for detecting an angle representative of the direction at which the lateral forces exert on the stylus. Resolver means is adapted to produce a resolved signal whose amplitude and polarity are dependent upon the sensed stylus position. Reversible means is controlled by the resolver for rotating the bias means about the stylus axis to move the point of application of said lateral force to various positions around the stylus axis so as to exert components of force normal to and tangent to the profile of the template until the resolved signal amplitude equals zero.

---

This invention relates to an electro-mechanical stylus steering system for a tracer valve.

Tracer valves are frequently used as controls for relatively positioning a workpiece and a cutting tool for the purpose of duplicating the contour of a template or a pattern which is traced by the tracer valve. Tracer valves of this general type are shown in U.S. Patent No. 2,753,145 to Roy Rosebrook, issued July 3, 1956, and U.S. Patent No. 2,909,357 to Roy Rosebrook, issued Oct. 20, 1959. These patents may be consulted for more complete information regarding details of tracer valve construction and operation which are not directly involved in the elements of this invention.

In the aforementioned Patent No. 2,909,357 there is disclosed a tracer steering system. In this system the tracer valve includes a pair of spool valves for controlling application of power relatively to shift a workpiece and a cutting tool. Each of the valves controls movement along a respective one of two mutually perpendicular axes. A stylus is mounted in a rotatable sleeve within the tracer valve, the sleeve carrying a bias means for deflecting the tip of the stylus. The tip of the stylus protrudes from the tracer valve and makes contact with the template edge. Reversible means is provided for turning the sleeve so as adjustably to move the bias means around the valve axis, displacing the stylus from its normal or null position (for example, perpendicular to the axes of the spool valves) in such a manner that the stylus contacts the template in a direction having a component normal to a tangent to the template (thereby holding the stylus against the template), and a component tangential to it (thereby leading the stylus along the template). Sensing means on the sleeve sense the tilt of the stylus relative to a null condition. The sensing means controls the reversible means so that the bias means is applied against the stylus so as to deflect the stylus in the above discussed manner.

The sensing means disclosed in Patent No. 2,909,357 generally comprises a variable orifice and a fixed orifice. The size of the variable orifice is a function of stylus displacement. Thus, as the stylus reacts with the template edge, the size of the variable orifice changes. A signal representative of the stylus condition is derived from pressure variations caused by variations in the variable orifice. This signal controls the reversible means.

It is an object of this invention to provide a sensing system whereby a null condition of the stylus may occur at any angle of inclination and the sensing system senses deviations from that inclination.

Another object of the present invention is to provide a method of adjustably varying the angle at which a bias force is exerted on a stylus of a tracer valve by generating two signals, $E_x$ and $E_y$, representative of the deflection of the stylus in two, non-parallel directions, deriving a third signal which is a function of $E_x$, $E_y$ and an angle representative of the direction at which the bias force to be adjusted is exerted on the stylus, and rotating the bias force about the axis of the stylus until the third signal equals zero.

Another object of the present invention is to provide an electrical sensing means for sensing the deflection of a stylus in a plurality of non-parallel directions and controlling a motor. Bias means is connected to said motor and is rotated by said motor so as to deflect the stylus in such a manner that the stylus traces a template.

According to the present invention, a plurality of electronic sensors senses the deflection of the stylus along a plurality of non-parallel directions, and provides a plurality of output signals indicating the position of the stylus along each of the directions. These signals control a servo-control mechanism for reversibly controlling the direction of a motor. The motor is mechanically connected to a bias means so as to deflect the stylus in such a manner that the stylus contacts the template with a force having a component normal to the template and a component tangent to the template at the point of contact.

An optional and desirable object of the present invention is to provide a manual remote control for an automatic stylus steering system whereby the steering system may operate either automatically or manually.

Another optional and desirable object of the present invention is to provide a switch means in a stylus steering system for a tracer valve whereby the direction of the tracing path may be reversed.

The above and other features of this invention will be fully understood from the following detailed description and the accompanying drawings, in which:

FIG. 3 is a circuit diagram of the sensing and control system of the present invention.

Figure 1:
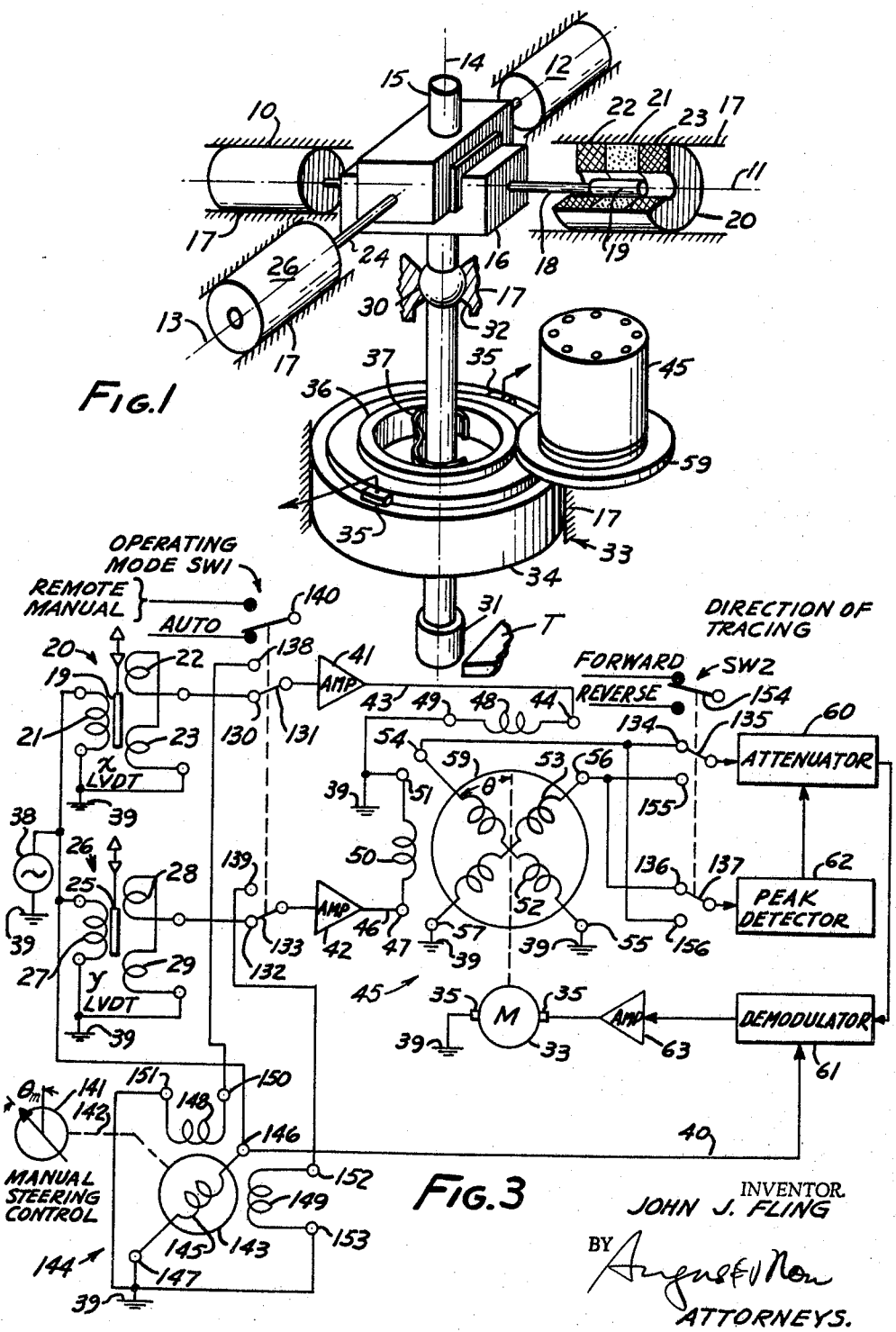
FIG. 1 is a perspective view of a portion of a stylus steering control system according to the presently preferred embodiment of the present invention.
Figure 2:
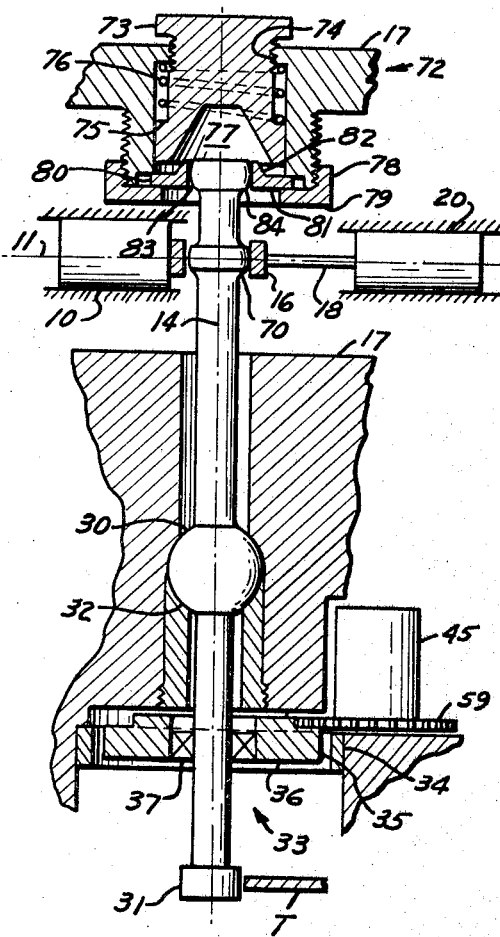
FIG. 2 is a partially cutaway side view of the system shown in FIG. 1.

Referring to FIGS. 1 and 2, a machine tool control according to the present invention utilizes a tracer valve as its primary control means. This tracer valve has an X axis spool valve 10 having an axis 11, and a Y axis spool valve 12 having an axis 13. These spool valves are mounted so that their axes are perpendicular to each other. Their axes are also substantially perpendicular to the axis 14 of a tracer stylus 15 when the tracer stylus is in a null, undeflected condition and neither of spool valves 10 or 12 are open to flow. The spool valves are operationally connected to the stylus by means of a yoke assembly 16. The details of construction of these spool valves form no part of this invention. Said details may be obtained from the aforementioned Patent No. 2,753,145. Suffice it to say here that these are spool type 4-way valves (with a null off position) and have the ability to control flow in two different directions in a circuit at a rate determined by the amount of shift of the spool in its sleeve.

A shaft 18 is connected to the yoke assembly parallel to axis 11 of X axis spool valve 10. A core 19 of a linear voltage differential transformer (LVDT) 20 is connected to one end of shaft 18. The differential transformer has a primary winding 21 and a pair of serially connected secondary windings 22 and 23. The windings of differential transformer 20 are held stationary to the body of the tracer valve 17. Another shaft 24 is connected to the yoke assembly parallel to axis 13 of the Y axis spool valve and carries the core 25 (FIG. 3) of a second LVDT 26. LVDT 26 is similar to LVDT 20 and also has a primary winding 27 and a pair of serially connected secondary windings 28 and 29.

The yoke assembly 16 is operationally mounted to the stylus in a manner described hereinafter. A ball-like member 30 is preferably, although not necessarily, placed at an intermediate position between the ends of said stylus. This ball-like member serves as a fulcrum, so that the bottom (or tip) portion 31 of the stylus is deflected through some angle, the portion of the stylus on the opposite side of the ball-like member moving through an equal and opposite angle so as to move the X axis spool valve and Y axis spool valve by distances which are proportional to the components of motion of the tip of the stylus along the respective axes. The ball-like member is mounted in a suitable ball seat 32 in the tracer valve 17. Thus, the stylus is universally mounted for its tilting or deflecting movement by the ball-like member and the ball seat.

In order to tilt the stylus so as to cause it to follow a template, a bias means 37 is provided. To turn the bias means, a torque motor 33 is fixed to the body and includes a stator 34, a brush mechanism 35 and a rotatable rotor 36. The torque motor axis is concentric with axis 14.

Bias means 37 is attached to the rotor so as to bias the stylus in one direction and comprises a leaf spring attached to the inner circumference of the rotor and positioned to urge the stylus in said one direction.

Referring to FIG. 3, there is shown a source of suitable voltage, such as 60 cycle, 115 volt alternating current at 38. The source of alternating current is connected directly to the primary windings 21 and 27 of the linear voltage differential transformers 20 and 26, respectively. One side of the alternating current may be grounded, as indicated at 39, while the other side is connected to a lead 40 which is connected to a demodulator 61, for purposes to be later explained.

The secondary windings 22 and 23 of linear voltage differential transformer 20 are connected through contacts 130, 131 of switch SW1 to the input of the first alternating current amplifier 41; while the secondary windings 28 and 29 of linear voltage differential transformer 26 are connected through contacts 132, 133 of switch SW1 to the input of a second alternating current amplifier 42. The voltage output from the amplifier 41, which will sometimes hereinafter be referred to as $E_x$, is connected via lead 43 to a first terminal 44 of a resolver 45. The voltage output from alternating current amplifier 42, which will sometimes hereinafter be referred to as $E_y$, is connected via lead 46 to terminal 47 of the resolver 45. Terminal 44 is connected through a first primary winding 48 and terminal 49 to ground 39; while terminal 47 is connected through a secondary primary winding 50 and terminal 51 to ground 39.

The secondary windings of resolver 45 comprise windings 52 and 53. Terminals 54 and 55 are connected to winding 52, while terminals 56 and 57 are connected to winding 53. Windings 52 and 53 are mounted 90° out of phase on a rotatable housing 59.

The voltage across winding 52 will sometimes be hereinafter referred to as $E_{52}$; while the voltage across winding 53 will sometimes hereinafter be referred to as $E_{53}$.

Attenuator 60 receives an input through contacts 134, 135 of switch SW2 from winding 52 of the resolver. The output of the attenuator 60 is connected to the input of a demodulator 61. A peak detector 62 receives an input through contacts 136, 137 of switch SW2 from winding 53 and produces an output, which output is connected to the attenuator. Peak detector 62 provides an automatic gain control signal for the attenuator dependent on the peak of $E_{53}$. The voltage, $E_{52}$, is therefore attenuated in accordance with the gain control set by the peak of voltage $E_{53}$.

The voltages $E_{52}$ and $E_{53}$ are represented by the following equations:

(1) $$E_{52} = K(E_y \cos \theta - E_x \sin \theta),$$

and (2) $$E_{53} = K(E_y \sin \theta + E_x \cos \theta)$$

where K is a constant dependent upon the winding ratios of the resolver and $\theta$ is the angular displacement of the rotatable housing 59 and, hence, the displacement of the windings 52 and 53 relative to windings 48 and 50. As will be noted hereinafter, the bias means is rotated by a torque motor which also rotates the rotatable housing 59. Therefore it will be appreciated that $\theta$ also represents the angular displacement of the bias force from the X axis, and is detected by the relative displacement of windings 52 and 53 to windings 48 and 50, which displacement is determined by the position of rotatable housing 59.

At a null condition, the voltage $E_{52}$ equals zero. Hence, from Equation 1, (3) $$E_y \cos \theta = E_x \sin \theta$$

and (4) $$\theta = \text{Arctan} \frac{E_y}{E_x}$$

Thus, the voltage at nullity of $E_{53}$ may be readily obtained:

(5) $$E_{53} = K \sqrt{E_x^2 + E_y^2}$$

The output of the attenuator, therefore, is represented by $E_{52}$, as determined by Equation 1 above, attenuated by the gain of the attenuator determined by $E_{53}$, determined by Equation 2 above.

As the tip of the stylus is moved along the template, the deflection of the stylus is varied in accordance with the outline of the template and with the relative location of body 17. Since the ball-like member 30 operates as a fulcrum for the stylus, movement of the tip of the stylus is reflected to the shafts 18 and 24 attached to the yoke assembly. Thus the cores of the linear voltage differential transformers 20 and 26 move in accordance with the position of the template stylus along the X and Y axes, causing a change in the voltage amplitudes induced in the secondary windings of the differential transformers. Thus, the voltage amplitudes of $E_x$ and $E_y$ are dependent upon the position of the cores within their respective transformers, which are in turn dependent upon the displacement of the stylus.

Demodulator 61 serves to demodulate the 60 cycle signal via lead 40 from the resultant signal from attenuator 60. Thus the output of the demodulator 61 is representative of the composite deflections in both the X and Y directions of the stylus as it follows along the template. This signal is amplified by a D.C. amplifier 63 and the amplified result is used to drive the torque motor 33.

Referring to FIG. 2, the control assembly of FIG. 1 is shown incorporated within a tracer valve in cross-section. The X axis spool valve 10 is operationally connected to yoke assembly 16. This yoke assembly is mounted to ball-like member 70 which is incorporated in the stylus. Deflection of the stylus in a direction along the X axis will cause ball-like member 70 to move yoke assembly 16 so as to shift the spool of the X axis spool valve and regulate the rate and direction of flow through said valve. The regulated flow is directed to a power means for actuating the machine tool in the direction of the X axis. In a similar manner, deflection of the stylus in a direction having a component along the Y axis would cause the ball-like member 70 to shift yoke assembly 16 so as to shift the spool of the Y axis spool valve and regulate the rate and direction of flow through said valve. The regulated flow is directed to a power means for actuating the machine tool in the direction of the Y axis.

Rate control means 72 is incorporated for adjusting the maximum rate of travel of the machine tool. Plug 73 is threaded into a socket 74 in the top of the body of the tracer valve 17. An external shoulder 75 on the rate control member holds a coil spring 76 in opposition to plug 73 for eliminating thread play in the rate control member. The lower portion of the rate control member has an internal conical surface 77 with a conical angle therein which is preferably 60°. To the lower end of rate control means 72 there is threaded a retainer 78 having an inwardly directed flange 79 below plug 73.

A ring member 80 which has a flange 81 is placed with its flange between the lower surface of plug 73 and flange 79. The ring member has an elevated central section with a frusto-conical surface 82 having the same conical angle as surface 77. Passage 83 through said ring member, which is co-axial with said frusto-conical surface 82, accommodates a third ball-like member 84 which is incorporated into the stylus at its upper end. This ball-like member 84 snugly fits within passage 83 so that sideward movement of the third ball-like member in any horizontal component of motion shifts the ring member correspondingly. However, the permissible sideward movement of the ring member is limited by the lateral separation between the conical surfaces 77 and 82. This separation can be changed by turning plug 73 so as to move it upwardly or downwardly.

Stator 34 of the torque motor is fixed to the body of the tracer valve 17. Thus, as the torque motor operates, bias means 37, which is carried within the rotor, biases the stylus in different directions about its own axis. The rotatable housing 59 of the resolver 45 is operationally connected to the rotor through any suitable gear or drive mechanism and is adapted to turn with the rotor. Thus, a change in the direction of the bias on the stylus caused by rotation of the motor is sensed by rotation of the housing 59 in the resolver 45. This deflection causes a change in the angle of the secondary windings of the resolver with respect to its primary windings, as hereinbefore described.

As taught in the aforementioned Patent No. 2,909,357, bias means is normally disposed at an angle, preferably 45°, with the normal to the point of contact with the template. The bias means tends to deflect the stylus longitudinally along the template while still holding the stylus in contact therewith.

Figure 4:
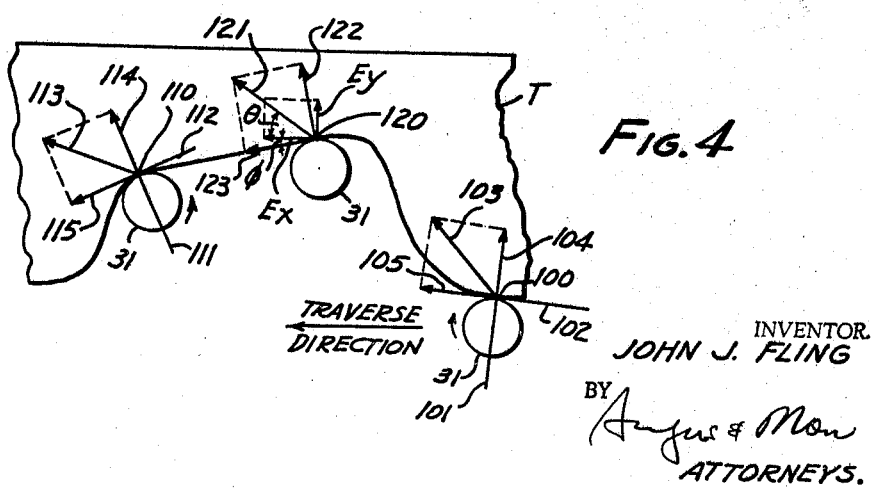
FIG. 4 is a schematic illustration of the operation of this device.

Assuming for a moment that the template recedes away from the stylus, as illustrated in the right-hand side of FIG. 4, it is desirable that the biasing means be rotated clockwise to maintain the desired angle with the normal to the point of contact with the template. The right-hand side of FIG. 4 illustrates the need for rotation in this direction. Point 100 is the point of contact between the stylus tip 31 and the profiles of the template at a position where the template profile is curving (sometimes called "sloping") away from the traverse direction. Line 101 is normal to the template at point 100 and line 102 is perpendicular to normal, that is, tangent to the template profile at point 100. In order for the stylus to remain in contact with the profile and still trace along it, the bias force (shown applied at the point of contact for convenience of disclosure) is exerted along line 103. This gives a normal component 104 and a lateral component 105. The normal component maintains contact with the profile, and the lateral component displaces the stylus so that the stylus traces along the profile. It will be appreciated that once the bias means is adjusted to apply to the two components at any slope, or direction, relative to the traverse direction, and that if the slope remains constant, there will be no further change in the bias position until the slope again changes.

A slope change wherein the template edge approaches the stylus is shown at the left-hand side of FIG. 4. Here the profile of the template is at a position where the template profile is curving toward the traverse direction. Point 110 is the point of contact between the stylus and the profile of the template, line 111 is normal to the template at point 110, and line 112 is tangent to the template profile at point 110. In order for the stylus to remain in contact with the profile and still trace along it, the bias force is exerted along line 113, giving a normal component 114 and a lateral component 115.

Once the mechanism herein has adjusted the direction of the bias to correspond with some given angle which the tangent to the template makes at the point of contact, the bias direction remains unchanged until this angle again changes. Thus, there is no further change when the profile is a straight line, regardless of its angle with the X axis. A change in the bias direction does, however, need to be made when the angle of the tangent changes, and there are two cases: (1) where the template profile curves away from the traverse direction; and (2) where the template profile curves toward the traverse direction. Case (1) is illustrated at the right-hand side of FIG. 4, the curvature of the template tending to reduce, or even eliminate, the normal force component. Therefore, a clockwise rotation of the bias means is necessary in order to keep the stylus in contact with the template. In case (2), as shown in the left-hand side of FIG. 4, the curvature of the template tends to reduce, or even eliminate, the lateral force component. Therefore, a counterclockwise rotation of the bias means is necessary in order to keep the stylus moving along said template profile.

Cases (1) and (2) are discrete conditions, and there is no redundancy or confusion between them. In case (1), the bias force is decreasing in the traverse direction, while in case (2) it is increasing in the traverse direction. Null conditions are restored when the bias means supplies its force at 45° angle to the normal at the point of contact.

Linear voltage differential transformers 20 and 26 detect the changes in deflection of the stylus tip against a template in the X and Y directions. During null conditions, the forces are equally applied to the normal and tangent at the point of contact between the stylus and the template, for example, the bias force may be 45° from the tangent. If the tangent is also along the X axis, $E_x$ and $E_y$ are equal, and $\theta$ is 45°. If, however, the slope of the template (the tangent) is at some angle $\phi$ from the X axis, $\theta - \phi = 45°$. This is illustrated at the center of FIG. 4.

Point 120 is the point of contact between the stylus and the profile of the template; the bias force is exerted along line 121 giving equal normal 122 and lateral 123 components. The biasing means, of course, is not being rotated because the profile is not changing. Assuming $\phi$ is $-15°$, it is appreciated that $\theta$ is 30°, and that $E_x = 1.7 E_y$. Thus, the deflections sensed along the X and Y axes are not necessarily equal at nullity; the value of $\theta$ being an important consideration. It is apparent from Equation 1 that $E_x$ and $E_y$ are equal at nullity only $\theta = 45°$; and that nullity may occur any time that $$\frac{E_y}{E_x} = \tan \theta$$

However, should either or both of the X and Y components change, the cores 19 and 25 of the differential transformers are caused to move in a manner hereinbefore described, causing a change in voltage amplitude on the secondary windings of the differential transformers. This signal is reflected through the resolver and signals are derived in accordance with the above mentioned formulae at the attenuator and peak detector. The peak detector then adjusts the automatic gain control of the attenuator in accordance with its received signal, and the resultant signal is demodulated, providing an accurate signal representative of the composite X and Y deflections. This signal is thus applied to the torque motor to rotate the bias means on the stylus, and the rotatable housing 59 of the resolver.

The polarity of the signal delivered to the torque motor is determined from Equation 1:

$$E_{52} = K(E_y \cos \theta - E_x \sin \theta)$$

At null conditions, $E_{52} = 0$. However, if $E_x$ decreases or $E_y$ increases due to a sensing of a change in the template configuration, $E_{52}$ becomes positive and drives the torque motor in a first direction until null conditions are again sensed. Conversely, if $E_x$ increases or $E_y$ decreases due to a sensing of a change in the template configuration, $E_{52}$ becomes negative and drives the torque motor in an opposite direction until null conditions are sensed. Thus, the torque motor is reversible, dependent upon the polarity of the signal $E_{52}$ from the resolver.

When the bias means has rotated about the stylus to a null condition of 45° to the normal at the point of contact with the template, the scondary windings of the resolver are again aligned in a manner hereinbefore described, causing the resolver to sense nullity conditions.

It should be noted that the bias force may be applied to the stylus at angles other than 45° from the normal at the point of contact between the stylus and the template, and the 45° angle is given by way of example and not of limitation. Actually, the angle may be any desirable angle, and the above principles will still apply (substituting the desired angle from the normal at the point of contact between the stylus and the template for the 45° given in the example).

The present stylus steering system preferably includes a provision whereby the direction at which the bias force is to be exerted on the stylus may be selected by manual remote control.

Switch SW1 is illustrated in FIG. 3 having a pair of ganged armature contacts 131 and 133. (A third armature contact 140 is illustrated ganged with contacts 130 and 133 to illustrate the two modes of operation controlled by switch SW1. In practice, contact 140 may be eliminated, or it may be used for controlling indicating circuitry for indicating the position of the switch contacts.)

Movable armature contact 131 is adapted to selectively engage stationary contacts 130 and 138; while movable armature contact 133 is adapted to selectively engage stationary contacts 132 and 139.

A rotatable manual steering control dial 141 is connected by a suitable shaft or other means 142 to a rotatable housing 143 of a resolver 144. Manual steering control dial 141 may be graduated into suitable divisions (not shown) so that the operator thereof may accurately control the setting of dial 141.

Resolver 144 includes a primary winding 145 mounted on rotatable housing 143 between terminals 146 and 147. The secondary windings on resolver 144 comprise windings 148 and 149 mounted 90° out of phase. Terminals 150 and 151 are connected to winding 148, while terminals 152 and 153 are connected to winding 149. One side of each of windings 148 and 149 is connected to ground 39 through terminals 151 and 153, respectively. The opposite side of winding 148 is connected through terminal 150 to stationary contact 138 of switch SW1, while the opposite side of winding 149 is connected through terminal 152 to stationary contact 139 of switch SW1. One side of primary winding 145 is connected through terminal 146 to the source of alternating current 38, while the other side of primary winding 145 is connected through terminal 147 to ground 39.

When switch SW1 is in the lower, or AUTOMATIC position, the X and Y LTDs 20 and 26, respectively, are connected to primary windings 48 and 50 of resolver 45, and the operation of the stylus steering system is as hereinbefore described. When switch SW1 is in the upper, or REMOTE MANUAL position, armature contact 131 contacts stationary contact 138 and armature contact 133 contacts stationary contact 139.

Primary winding 145 of resolver 144 is energized by source 38. Winding 145 induces a voltage in each of secondary windings 148 and 149, dependent upon the angular position $\theta_m$ of dial 141 and rotatable housing 143.

The voltage across winding 148 will sometimes be hereinafter referred to as $E_{148}$; while the voltage across winding 149 will hereinafter be referred to as $E_{149}$. The voltages $E_{148}$ and $E_{149}$ are represented by the following equations:

(6) $$E_{148} = K'E_o \cos \theta_m$$
and
(7) $$E_{149} = K'E_o \sin \theta_m$$

where $K'$ is a constant dependent upon the winding ratios of resolver 144, $E_o$ is the voltage available from source 38, and $\theta_m$ is the angular displacement of rotatable housing 143 relative to a base coordinate of the tracing system, for example, X axis 11.

At a null condition, $E_{148}$ equals $E_{149}$. Hence, from Equations 6 and 7:

(8) $$\theta_m = \text{Arctan} \frac{E_{149}}{E_{148}}$$

When switch SW1 is in the upper, or REMOTE MANUAL position, $E_{148}$ is amplified by amplifier 41 to derive $E_x$, and $E_{149}$ is amplified by amplifier 42 to derive $E_y$. Therefore, from Equations 4 and 8, at nullity:

(9) $$\theta = \theta_m$$

Since $\theta$ is equal to $\theta_m$ at null conditions, manual rotation of dial 141 and resolver 144 will cause resolver 45 and the biasing ring assembly to follow in a 1:1 relationship. Thus, rotation of dial 141 through any angle $\theta_m$ will cause a change in the value of voltages $E_{148}$ and $E_{149}$, thus causing a similar change in the values of voltages $E_x$ and $E_y$. The values of $E_{52}$ and $E_{53}$ change according to Equations 1 and 2, thereby energizing drive motor 33 and causing rotation of the biasing assembly and housing 59 until the angular displacement $\theta$ again equals $\theta_m$ and the steering sensing system returns to a nullity.

The present stylus steering system also preferably includes a provision for manually reversing the direction of the tracing path.

Switch SW2 is illustrated in FIG. 3 having a pair of ganged armature contacts 135 and 137. (A third armature contact 154 is illustrated ganged with contacts 135 and 137 to illustrate the two modes of operation controlled by switch SW2. In practice, contact 154 may be eliminated, or may be used for controlling suitable indicating circuitry for indicating the position of the switch.)

In the upper, or FORWARD position of switch SW2, movable contact 135 contacts stationary contact 134 and movable contact 137 contacts stationary contact 136. In this position of switch SW2, the operation is as hereinbefore described.

When switch SW2 is in the lower, or REVERSE position, movable contact 135 contacts stationary contact 155, and movable contact 137 contacts stationary contact 156. Thus, attenuator 60 receives an input from winding 53 of resolver 45 while peak detector 62 receives an input from winding 52 of resolver 45. The voltage $E_{53}$ is therefore attenuated in accordance with the gain control set by the voltage $E_{52}$. Due to the 90° electrical relationship of the winding position of windings 52 and 53 of resolver 45, the is in the REVERSE position causing motor 33 to rotate X–Y coordinator system is shifted 90° when switch SW2 in the opposite direction from that hereinbefore described when switch SW2 is in the FORWARD position. The reference position of the spring bias assembly connected to motor 33 is shifted 90°, thereby reversing the direction of travel of the stylus along the template.

Since the direction of travel is reversed in the REVERSE position of switch SW2, $\theta$, as defined in Equations 1 and 2, is now negative. Therefore, from Equations 1 and 2:

(10) $\quad E_{52\,rev} = K[E_y \cos(-\theta) - E_x \sin(-\theta)]$
$\quad\quad\quad = -K[E_y \cos\theta + E_x \sin\theta]$ and

(11) $\quad E_{53\,rev} = K[E_y \sin(-\theta) + E_x \cos(-\theta)]$
$\quad\quad\quad = K[E_y \sin\theta - E_x \cos\theta]$ At a null condition, the voltage $E_{53\,rev}=0$. The output of the attenuator is represented by $E_{53\,rev}$, as determined from Equation 11 above, attenuated by the gain of the peak detector determined by $E_{52\,rev}$, determined by Equation 10, above. The negative sign on Equation 10 has no effect on the peak detector since peak detector 62 provides a signal dependent on the absolute value of the peak of signal voltage $E_{52\,rev}$. Therefore, Equations 10 and 11 differ electrically from Equations 1 and 2, respectively, only in the trigonometric function of $\theta$.

The polarity of the error signal delivered to the torque motor is unchanged from that described when switch SW2 is in the FORWARD position, and is determined from Equation 11. For an increasing $E_y$ or a decreasing $E_x$, due to a sensing of a change in the template configuration, $E_{53\,rev}$ becomes positive and drives the torque motor in a first direction until null conditions are sensed. If $E_y$ decreases or $E_x$ increases due to a sensing of a change in the template configuration, $E_{53\,rev}$ becomes negative and drives the torque motor in an opposite direction until null conditions are sensed. The torque motor is therefore reversible depending upon the polarity of $E_{53\,rev}$ from the resolver.

By way of example, a suitable electro-mechanical steering system incorporating the principles of the present invention has been constructed for a tracer valve assembly. The steering system constructed utilized two linear voltage differential transformers Model No. 6234 manufactured by Automatic Timing & Controls, Inc., King of Prussia, Pa.; a resolver Model No. VRI 11/18–8a, manufactured by Vernitron Corp., Torrance, Calif.; and a torque motor Model No. VTM29–J, manufactured by Vernitron Corp., Torrance, Calif. The steering system so constructed was used for steering a tracer valve assembly Model No. B–360–3D manufactured by True-Trace Corporation, El Monte, Calif.

The present invention provides an accurate sensing system whereby deflections of the yoke, representative of actual conditions at the spool valves, are sensed and the bias means is rotated to apply against the stylus in a manner such that the stylus traces along the template by virtue of forces normal to and tangenital to the template configuration. The sensing system is economical and substantially free from costly maintenance and alignment problems.

I claim:

1. In combination with a tracer valve having a sylus for tracing along the profile of a pattern, said sylus having a longitudinal axis; valve means controlled by said sylus at a first point along said longitudinal axis, said sylus being deflectible to various positions around said longitudinal axis to seek contact with said profile at a second point along said longitudinal axis spaced from said first point, said stylus being deflectible to various positions around said longitudinal axis by contact with said profile; bias means connected to the tracer valve for rotational movement about the sylus axis for exerting a lateral force on said stylus at a third point spaced from said first and second points to deflect the stylus relative to the tracer valve, thereby adjusting said sylus; sensing means for detecting said stylus position in a plurality of non-parallel directions; rotatable means for detecting an angle representative of the direction at which the lateral force is exerted on said stylus; resolver means adapted to produce a resolved signal whose amplitude and polarity are dependent on the sensed stylus position and on said angle; and reversible means controlled by the resolver means for rotating said bias means about the stylus axis to move the point of application of said lateral force to various positions around the stylus axis so as to exert components of force normal to and tangent to the profile of the template at the point of contact between the profile and the stylus until said resolved signal amplitude equals zero.

2. Apparatus according to claim 1 wherein said sensing means comprises a plurality of transducer means each capable of producing an electric signal representative of the position of said stylus in one of said plurality of non-parallel directions; said resolver means adapted to be connected to each of said transducer means; said reversible means including reversible motor means whose direction of rotation is determined by the polarity of said resolved signal.

3. Apparatus according to claim 2 wherein each of said transducer means comprises a differential transformer, movable core means for each of said transformers, means coupling each of said core means to said stylus at said first point for moving each of said core means in one of said non-parallel directions in accordance with said stylus deflections; said resolver means including a plurality of primary windings each adapted to be connected to one of said plurality of transformers, a pair of secondary windings, mounting means mounting said secondary windings, attenuator means connected to one of said pair of secondary windings for attenuating said resolved signal, gain control means for controlling the attenuation of said attenuator means, and means connected to the other of said pair of windings for controlling said gain control means.

4. Apparatus according to claim 3 wherein said rotatable means comprises means connected to said motor means for rotating said mounting means.

5. Apparatus according to claim 1 wherein said sensing comprises first transducer means for detecting the stylus position in one direction, second transducer means for detecting the stylus position in a second direction, said first and second directions being mutually non-parallel, each of said transducer means being capable of producing an electric signal; said resolver means adapted to be connected to each of said transducer means; said reversible means including reversible motor means whose direction of rotation is determined by the polarity of said resolved signal.

6. Apparatus according to claim 5 wherein each of said transducing means comprises a differential transformer, movable core means for each of said transformers, means coupling each of said core means to said stylus at said first point for moving each of said core means in one of said mutually non-parallel directions in accordance with said stylus deflections; said resolver including a pair of primary windings, each adapted to be connected to one of said transformers, a pair of secondary windings, mounting means mounting said secondary windings, attenuator means connected to one of said pair of secondary windings for attenuating said resolved signal, gain control means for controlling the attenuation of said attenuator means, and means connected to the other of said pair of secondary windings for controlling said gain control means.

7. Apparatus according to claim 6 wherein said rotatable means comprises means connected to said motor means for rotating said mounting means.

8. Apparatus according to claim 1 further including manually operable means for producing a signal representative of a selected desired direction at which the lateral force is to be exerted on said stylus, first switch means having a first position for connecting said resolver means to said sensing means and having a second position for connecting said resolver means to said manually operable means, whereby when said first switch means is in its first position said resolver produces a signal whose ampltiude and polarity are dependent on the sensed stylus position as sensed by said sensing means and on said angle, and when said first switch means is in its second position said resolver produces a signal whose amplitude and polarity are dependent on the selected direction of lateral force and on said angle.

9. Apparatus according to claim 8 wherein said manually operable means comprises a rotatable housing, a primary winding mounted on said rotatable housing, secondary winding means juxtaposed to said primary winding for producing a signal representative of the rotational position of said rotatable housing, means connecting said secondary winding means to the second position of said first switch means, and selectable means for selecting the rotational position of said rotatable housing.

10. Apparatus according to claim 1 further including second switch means for reversing the direction of said reversible means.

11. Apparatus for adjustably varying the angle at which a bias force is exerted on a deflectible stylus of a tracer valve, said stylus having an axis and being capable of tracing along the profile of a pattern, said stylus being deflectible to said contact with said profile and being deflectible by said profile, said apparatus comprising:
 (a) first sensing means for sensing the deflection of said stylus in one direction non-parallel to the axis of said stylus;
 (b) second sensing means for sensing the deflection of said stylus in another direction non-parallel to the axis of said stylus, said one direction and said other direction being mutually non-parallel;
 (c) first generating means connected to said first sensing means for generating a first electrical signal, $E_x$, representative of the sensed deflection in said one direction;
 (d) second generating means connected to said second sensing means for generating a second electrical signal, $E_y$, representative of the sensed deflection in said other direction;
 (e) resolver means connected to said first and second generating means for providing a third electrical signal, $E_3$, in accordance with the equation:

$$E_3 = K(E_y A - E_x B)$$

where K is a constant, A and B are different natural trigonometric functions of $\theta$, and $\theta$ is an angle representative of the direction at which the bias force to be adjusted is exerted on said stylus; and
 (f) rotatable means connected to said resolver means for rotating the bias force about the axis of the stylus until the third electrical signal equals zero.

12. Apparatus according to claim 11 wherein said rotatable means comprises:
 (g) means connected to said first and second generating means for providing a fourth electrical signal, $E_4$, in accordance with the equation:

$$E_4 = K(E_y B + E_x A)$$

(h) attenuating means connected to said last-named means and said resolver means for attenuating the third electrical signal by varying the gain of said third electrical signal in accordance with said fourth electrical signal;
 (i) support means for mounting the bias force on an electrically rotatable axis concentric with the axis of said stylus; and
 (j) drive means connected to said attenuating means for rotating said support means about said rotatable axis, said drive means being operable by the attenuated third electrical signal.

13. Apparatus according to claim 12 wherein $A = \cos \theta$ and $B = \sin \theta$.

14. Apparatus according to claim 12 wherein $A = \sin \theta$ and $B = \cos \theta$.

References Cited

UNITED STATES PATENTS

| | | | |
|---|---|---|---|
| 3,006,595 | 10/1961 | Rosebrook | 251—3 |
| 3,114,295 | 12/1963 | Ronner et al. | 251—3 |
| 3,270,619 | 9/1966 | Magor | 95—62 XR |
| 3,372,619 | 3/1968 | Clegg | 90—62 |

WILLIAM F. O'DEA, Primary Examiner

R. GERARD, Assistant Examiner

U.S. Cl. X.R.

90—62; 318—162

UNITED STATES PATENT OFFICE
CERTIFICATE OF CORRECTION

Patent No. 3,481,577　　　　　　　　Dated December 2, 1969

Inventor(s) FLING, J. J.

It is certified that error appears in the above-identified patent and that said Letters Patent are hereby corrected as shown below:

Col. 1, L 16 - after "around" insert --a--

Col. 5, L 66 - change "profiles" to --profile--

Col. 6, L 47 - after "at" insert --a--

Col. 7, L 5 - change "attentuator" to --attenuator--

Col. 8, L 5 - change "TD's" to --LVDT's--

Col. 9, L 1 - change "is in the REVERSE position causing motor 33 to rotate" to -- X-Y coordinator system is shifted 90° when switch SW2--

Col. 9, L 2 - change "X-Y coordinator system is shifted 90° when switch SW2" to --is in the REVERSE position causing motor 33 to rotate--

Col. 9, L 47 - change "VRI" to --VRJ--

Col. 9, L 59 - change "tangenital" to --tangential--

Col. 11, L 20 (Claim 9) - change "selectable" to --selectible--

Col. 12, L 38 (References Cited) - change "251-3" to --90-62--

SIGNED AND
SEALED
OCT 20 1970

(SEAL)
Attest:

Edward M. Fletcher, Jr.
Attesting Officer

WILLIAM E. SCHUYLER, JR.
Commissioner of Patents